US010769715B1

(12) United States Patent
Coady et al.

(10) Patent No.: US 10,769,715 B1
(45) Date of Patent: Sep. 8, 2020

(54) SYSTEM AND PROCESS FOR IN-APP SALE OF PHYSICAL PRODUCTS

(71) Applicant: Etalify Inc., Issaquah, WA (US)

(72) Inventors: Philip G. Coady, Issaquah, WA (US); Brett L. Nagy, Issaquah, WA (US); Michael R. Hanney, Issaquah, WA (US)

(73) Assignee: Etalify Inc., Issaquah, WA (US)

( * ) Notice: Subject to any disclaimer, the term of this patent is extended or adjusted under 35 U.S.C. 154(b) by 793 days.

(21) Appl. No.: 15/255,865

(22) Filed: Sep. 2, 2016

Related U.S. Application Data

(60) Provisional application No. 62/214,707, filed on Sep. 4, 2015.

(51) Int. Cl.
*G06Q 30/00* (2012.01)
*G06Q 30/06* (2012.01)
(Continued)

(52) U.S. Cl.
CPC ....... *G06Q 30/0637* (2013.01); *G06Q 20/322* (2013.01); *G06Q 30/0643* (2013.01);
(Continued)

(58) Field of Classification Search
None
See application file for complete search history.

(56) References Cited

U.S. PATENT DOCUMENTS 6,401,077 B1 * 6/2002 Godden .................. G06Q 30/06
705/26.8
8,438,079 B1 5/2013 Nguyen et al.
(Continued)

FOREIGN PATENT DOCUMENTS

WO 2012/173301 A1 12/2012

OTHER PUBLICATIONS

App Monetization: 6 Bankable Business Models That Help Mobile Apps Make Money. (2014). Retrieved from http://info.localytics.com/blog/app-monetization-6-bankable-business-models-that-help-mobile-apps-make-money. (Year: 2014).*
(Continued)

*Primary Examiner* — Abby J Flynn
(74) *Attorney, Agent, or Firm* — Quarles & Brady LLP

(57) ABSTRACT

A system for in-application sale of physical goods on a mobile device is provided. The system includes one or more computer devices, and computer processors. The system includes a fulfillment module, a purchase module, and an application software for e-commerce sale of physical goods ("p-sale app"). The p-sale app is formed by integrating an e-commerce physical product sale protocol into an app lacking functionality for the sale of physical products ("no-sale app"). The p-sale app is configured to (i) send one or more product offer request(s) to the fulfillment module. The fulfillment module is configured to receive the product offer request(s) and (ii) search one or more databases containing information on a plurality of physical products. The search is based on the product, customer, and/or app criteria in the product offer request(s). The fulfillment module subsequently (iii) generates a product offer profile based on the criteria, and (iv) sends the product offer request to the p-sale app. The p-sale app is further configured to (v) display the product offer profile on the user interface. The p-sale app is configured to (vi) receive a request to purchase a physical product in the product profile, and (vii) send the purchase request to the purchase module. The purchase module is configured to receive the purchase request and (viii) transmit the purchase request to a fulfillment entity.

20 Claims, 2 Drawing Sheets

(51) Int. Cl.
*H04M 1/725* (2006.01)
*H04L 29/08* (2006.01)
*G06Q 20/32* (2012.01)
*H04W 4/60* (2018.01)

(52) U.S. Cl.
CPC ........ *H04L 67/02* (2013.01); *H04M 1/72522* (2013.01); *H04W 4/60* (2018.02)

(56) References Cited

U.S. PATENT DOCUMENTS

| | | | |
|---|---|---|---|
| 8,527,361 | B2 | 9/2013 | Paleja et al. |
| 8,843,161 | B2 | 9/2014 | Kirik et al. |
| 9,285,977 | B1* | 3/2016 | Greenberg ............ G06F 40/106 |
| 2003/0144921 | A1 | 7/2003 | Okubo et al. |
| 2006/0206391 | A1* | 9/2006 | Delson ............... G06Q 30/0621 |
| | | | 705/26.5 |
| 2010/0166394 | A1 | 7/2010 | Ariyoshi et al. |
| 2012/0191568 | A1 | 7/2012 | Gandhi |
| 2012/0330786 | A1* | 12/2012 | Paleja .................... G06Q 30/02 |
| | | | 705/26.41 |
| 2013/0054409 | A1 | 2/2013 | Lee et al. |
| 2013/0138558 | A1 | 5/2013 | Rannu et al. |
| 2013/0173426 | A1* | 7/2013 | Deutscher ............ G06Q 20/127 |
| | | | 705/26.41 |
| 2013/0174021 | A1* | 7/2013 | Buchwald ............. G06F 40/154 |
| | | | 715/235 |
| 2013/0226991 | A1* | 8/2013 | Isaacs ..................... H04L 67/02 |
| | | | 709/203 |
| 2014/0025521 | A1 | 1/2014 | Alsina et al. |
| 2014/0081773 | A1 | 3/2014 | Foster et al. |
| 2014/0214686 | A1 | 7/2014 | Wu |
| 2015/0127478 | A1 | 5/2015 | Westby et al. |

OTHER PUBLICATIONS

Zorzini, Catalin. "Shopify Vs. BigCommerce—Ecommerce Platform Comparison." Dec. 30, 2014 https://www.business2community.com/tech-gadgets/shopify-vs-bigcommerce-ecommerce-platform-comparison-01107572 (Year: 2014).*
Sarah Perez, Tech Crunch, Amazon Opens Its Associates Affiliate Program to Mobile App Developers, https://techcrunch.com/2013/08/27/amazon-opens-its-associates-affiliate-program-to-mobile . . . , posted Aug. 27, 2013, printed Sep. 2, 2016.
Amazon.com Associates Central, What is the Amazon Associates program?, https://affiliate-program.amazon.com/welcome/getstarted, printed Sep. 8, 2016.
Amazon.com Associates Central—Help, Building Links, https://affiliate-program.amazon.com/help/topic,/t5, printed Sep. 8, 2016.
Amazon.com Associates Central—Help, Add-to-Cart Buttons, https://affiliate-program.amazon.com/help/topic,/t6, printed Sep. 8, 2016.

* cited by examiner

SYSTEM AND PROCESS FOR IN-APP SALE OF PHYSICAL PRODUCTS

BACKGROUND

The present disclosure is directed to systems and processes for the in-application ("in-app") sale of physical products on mobile devices.

Known are platforms for the in-app purchase of digital goods on mobile devices. Many software applications ("apps"), such as games for example, allow users to purchase digital content items within the game app. Such digital content items are typically purchased from digital content stores and are then utilized within the application.

In spite of myriad platforms for the in-app purchase of digital goods, it is estimated that over 2.5 million apps for mobile devices exist that lack the ability sell physical products. A majority of these types of mobile apps provide content only and lack the functionality to sell physical products. Sale and purchase of a physical product by way of a content-only host mobile app typically involves switching the end user to a product purchase site that is outside of the host app. Such a practice is highly disfavored by app developers, the goal for whom is to maximize app visitor count, maximize app visit time, and maximize in-app conversion rates.

Conventional mobile apps purporting in-app physical product purchase capability are cumbersome and offer only a limited selection of physical products. Such mobile apps require the app provider to purchase an add-on software kit containing the desired sale functionality, the software kit requiring complex installation by the app provider and increasing the cost of app deployment. Software add-ons raise the risk of incompatibility and software bug problems to the app provider—surmounting to yet further drawbacks.

A need exists for a convenient, simple, and cost-effective way (i) to convert apps lacking the functionality to sell physical products (ii) into apps with the capability for the in-app sale of physical products. A need further exists (i) to convert mobile apps lacking the functionality to sell physical products (ii) into mobile apps with the capability for the in-app sale of physical products on a mobile device.

SUMMARY

The present disclosure provides a system. In an embodiment, a system for in-application sale of physical products on a mobile device is provided and includes one or more computer devices, and one or more computer processors. The system includes (A) a fulfillment module embodied in instructions stored by the one or more computer devices, (B) a physical product sale module embodied in instructions stored by the one or more computer devices, and (C) a purchase module embodied in instructions stored by the one or more computer devices. The physical sale module includes a software app lacking functionality for the sale of physical products ("no-sale app") and an e-commerce physical product sale protocol integrated into the no-sale app, which together form an application software for e-commerce sale of physical products (p-sale app). The p-sale app is embodied in instructions stored by the one or more computer devices that, when executed by the one or more computer processors, is configured to:

(i) send one or more product offer requests to the fulfillment module, the product offer request(s) comprising product, and/or customer, and/or app criteria, the fulfillment module, when executed by the one or more computer processors, is configured to:

(ii) search one or more physical product databases based on criteria in the product offer request(s), (iii) generate a product offer profile based on the criteria, and (iv) send the product offer profile to the p-sale app;

the p-sale app includes a user interface, the p-sale app further configured to:

(v) display the product offer profile on the user interface, (vi) receive a request to purchase a physical product present in the product offer profile, (vii) send the purchase request to the purchase module; and the purchase module, when executed by the one or more computer processors, is configured to:

(viii) send the purchase request to a fulfillment entity.

The present disclosure provides a process. In an embodiment, a process for in application sale of physical products on a mobile device is provided and includes:

integrating (i) an e-commerce physical product sale protocol into (ii) a software application lacking functionality for the sale of physical products (no-sale app);

transforming the no-sale app into an e-commerce sale of physical products app (p-sale app), the p-sale app having a user interface, the p-sale app embodied in instructions stored by the one or more computer devices that, when executed by the one or more computer processors, is configured to:

display, on a mobile device, screens having the look and feel of the screens of the no-sale app, a product offer profile of one or more physical products;

receive, from an end-user of the mobile device, a request to purchase a physical product from the product order profile; and send the purchase request to a fulfillment entity.

An advantage of the present disclosure is the end user does not leave the p-sale app when purchasing physical products on a mobile device. The system and process of the present disclosure provide the in-app sale and purchase of physical goods on a mobile device.

BRIEF DESCRIPTION OF THE DRAWINGS

The accompanying Figures together with the following description serve to illustrate and provide a further understanding of the disclosure and its embodiments and are incorporated in and constitute a part of this specification.

DEFINITIONS

Figure 1:
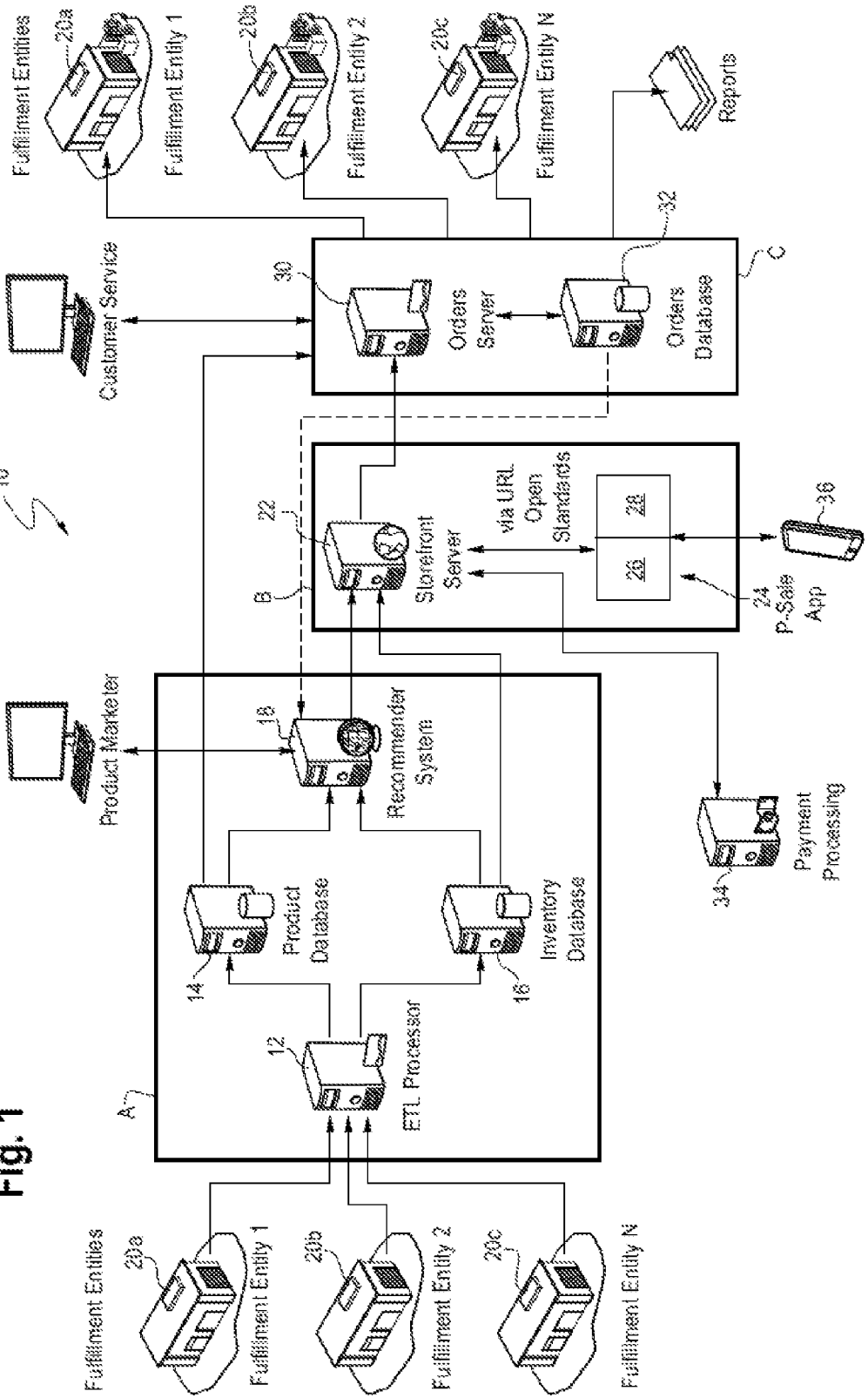
FIG. 1 is a schematic representation of a system for in-app sale of physical goods on a mobile device in accordance with an embodiment of the present disclosure.

"Application software" (an "application" or an "app") is a set of computer programs designed to permit the user to perform a group of coordinated functions, tasks, or activities. Application software cannot run on itself but is dependent on system software to execute. A mobile application (or "mobile app") is application software developed specifically for use on small, wireless computing devices, such as smartphones and tablets, rather than desktop computers or laptop computers.

An "application distribution platform" (or "app store") is a platform where users of computing devices can browse listing of applications and download certain applications to their respective computing devices. A developer may upload an application program to a distribution platform and may specify a title and description for the application program. The distribution platform may be responsible for accepting and promoting the uploaded application program to end users, and for delivery of the application program to those end users that request download of the application program. Application programs offered through an application distribution platform may have been developed using a common distribution platform-supplied software development kit, or versions thereof. The application distribution platform provides users a convenient service through which the users can view application programs that are available for installation and/or execution on their mobile devices. Nonlimiting examples of application distribution platforms include Apple's App Store, Google's Google Play, Blackberry's Blackberry World, Microsoft's Windows Phone Store, Samsung's Galaxy Apps.

The term "communicates" or "in communication with" or "communicatively connected," "communicatively linked" and like terms denotes a link between two or more objects (i.e., a link between two or more modules, units, sub-units, computing devices, processors, servers, etc.) that enables two-way exchange of information and includes a wired connection, a wireless connection, and combinations thereof.

The terms "comprising," "including," "having," and their derivatives, are not intended to exclude the presence of any additional element, component, step or procedure, whether or not the same is specifically disclosed. In contrast, the term, "consisting essentially of" excludes from the scope of any succeeding recitation any other element, component, step or procedure, excepting those that are not essential to operability. The term "consisting of" excludes any element, component, step, or procedure not specifically delineated or listed.

A "computing device" (or "a computer readable device") is a non-transitory computing device with a central processing unit (CPU), random access memory (RAM), and a storage medium (such as hard disk drive, solid state drive, flash memory, cloud storage. Nonlimiting examples of computing devices include personal computers (PCs), smart phones, laptops, mobile computing devices, tablet PCs, and servers. The term "computing device" may also describe two or more computing devices communicatively linked in a manner as to distribute and share one or more resources, such as clustered computing devices and server banks/farms. It is understood that any number of computing devices could be used, and embodiments of the present disclosure are contemplated for use with any computing device.

A "digital good" is an intangible good and does not have a physical nature. Digital goods are distinct from physical goods and physical products, physical goods and physical products being tangible objects. A distinguishing feature between digital goods and physical goods is that a digital good is downloadable from an application, whereas a physical goods is not downloadable from an application.

"Electronic commerce" (or "e-commerce") is the buying and selling of goods and services, or the transmitting of funds or data, over an electronic network, primarily the Internet. These transactions occur either business-to-business, business-to-consumer, consumer-to-consumer, or consumer-to-business.

A "fulfillment entity" is a supplier of physical goods and/or physical products. A fulfillment entity includes the infrastructure, logistics, and interface to (i) warehouse or store an inventory of physical products, (ii) electronically exchange information regarding product specifications, product inventory, and product availability (i.e., communication between computer devices), (iii) receive and process purchase order requests (i.e., communication between computing devices), (iv) prepare physical products for shipping (packaging, tracking, freight, postage, duty), and (v) ship or deliver (reporting, tracking, delivery confirmation) a physical product to a physical location.

An "in application sale" (or "in-app sale" or "IAS") is a sale-purchase transaction that occurs directly within the host application as opposed to the end-user being switched out of the context of the host application. The sale and purchase process is completed directly from within the host app and is seamless to the end user.

In-app sale of physical products excludes the sale of digital goods, and/or digital downloads. Nonlimiting examples of digital items excluded from an in-app sale of physical products include app games, app music, eBooks, e-movies, streaming, and in-app upgrades.

The "Internet" refers to interconnected (public and/or private) networks that may be linked together by protocols (such as TCP/IP and HTTP) to form a globally accessible distributed network. While the term Internet refers to what is currently known (e.g., a publicly accessible distributed network), it also encompasses variations which may be made in the future, including new protocols or any changes or additions to existing protocols.

The term "look and feel" refers to how an app interface (i.e., app display screen(s)) appears when an end user is interacting with, or is otherwise viewing, the app. Nonlimiting features influencing the "look" of an app display screen include color palette, images, layout, font selection, and overall styling. Nonlimiting features influencing the "feel" of an app display screen include the movement and response of dynamic components (dropdown menus, buttons, forms, galleries), sound effects, and the speed and manner by which display screens load.

A "mobile application," (or "mobile app"), is a type of software application designed to run on a mobile device, such as a smartphone or a tablet computer. Mobile applications frequently serve to provide users with similar services to those accessed on PCs. Mobile apps are generally small, individual software units with limited function. Mobile apps typically are internet applications that run on smartphones, computer tablets (such as iPad available from Apple, or Surface available from Microsoft). Some mobile apps take personal computer (PC)-based applications and port them to a mobile device.

A "mobile device" is a portable, wireless computing device that is small enough to be used while held in the hand; a hand-held device. A mobile device typically has a user interface display screen with touch input and/or a miniature keyboard and weighs less than 0.91 kilograms (kg) (2 pounds). A mobile device typically has an operating system (OS) and can run various types of application software (apps). Nonlimiting examples of a mobile device include smartphone, personal digital assistant (PDA), and tablet computer.

The term "Open Standards" (or "Open Standards System") refers to software interfaces, communication interfaces, or formats that are openly documented and have been accepted in the industry through either formal or de facto processes, and which are freely available for adoption by the industry. Nonlimiting examples of Open Standards software interfaces include HTTP HTML, JAVASCRIPT, TCP/IP, VoiceXML, XML, and SQL. Open Standards software interfaces are typically built by software engineers from various IT/software companies who collaborate under the auspices of organizations such as W3C, OASIS, OMA, and IETF.

The term "physical product" (or "physical good") is a tangible object. A physical product is shipped to a consumer and delivered to a physical, geographic location to a consumer. Physical products and physical goods are distinct from, and exclude, digital goods (digital goods being intangible objects).

A "server" is a computer program that provides services to other computer programs (and their users) in the same or other computing devices. The computing device that a server program runs in is also frequently referred to as a server (though it may be used for other purposes as well). In the client/server programming model, a server is a program that awaits and fulfills requests from client programs in the same or other computing devices. A given application in a computing device may function as a client with requests for services from other programs and also as a server of requests from other programs. Specific to the Web, a Web server is the computer program (housed in a computing device) that serves requested HTML pages or files. A Web client is the requesting program associated with the user. For example, the Web browser in a home PC is a client that requests HTML files from a Web server.

A "Uniform Resource Locator" (or "URL") is a formatted text string used by Web browsers, email clients, software, and apps to identify a network resource on the Internet. Network resources are files that can be plain Web pages, other text documents, graphics, or programs. A URL typically includes three subcomponents: (1) a network protocol, (2) a host name or address, and (3) a file or resource location.

"Wireless communication" is one or more wireless technologies such as Near Field Communications (NFC), Wi-Fi, infrared, Bluetooth, or one or more variants of wireless cellular technology.

A "web site" refers to a system that serves content over a network using the protocols of the World Wide Web. A web site may correspond to an Internet domain name, and may serve content associated or provided by an organization. The term may encompass (i) the hardware/software server components that serve objects and/or content over a network, and/or (ii) the "backend" hardware/software components, including any standard, non-standard or specialized components, that may interact with the server components that provide services for Web site users.

The "World Wide Web" (or "Web") refers to (i) a distributed collection of user-viewable or accessible documents (that may be referred to as Web documents or Web pages) or objects that may be accessible via a publicly accessible distributed network like the Internet, and/or (ii) the client and server software components which provide user access to documents and objects using communication protocols. A protocol that may be used to locate, deliver, or acquire Web documents or objects through HTTP (or other protocols), and the Web pages may be encoded using HTML, tags, and/or scripts. The terms "Web" and "World Wide Web" encompass other languages and transport protocols including or in addition to HTML and HTTP that may include security features, server-side, and/or client-side scripting.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

DETAILED DESCRIPTION

In an embodiment, a system for in-application sale of physical goods on a mobile device is provided. The system includes one or more computer devices, one or more computer processors, a fulfillment module, a physical product sale module, and a purchase module. The physical product sale module includes a software app lacking functionality for the sale of physical products ("no-sale app") and an e-commerce physical product sale protocol integrated into the no-sale app, which together form an application software for e-commerce sale of physical goods ("p-sale app"). Each of the fulfillment module, the physical product sale module, the purchase module, and the p-sale app is embodied in instructions stored by the one or more computer devices. When executed by the one or more computer processors, the p-sale app is configured to (i) send a product offer request to the fulfillment module. The product offer request(s) contains product, and/or customer, and/or app criteria. The fulfillment module, when executed by the one or more computer processors, is configured to receive the product offer request and (ii) search one or more databases containing information on a plurality of physical products. The search is based on the criteria in the product offer request. The fulfillment module subsequently (iii) generates a product offer profile based on the criteria, and (iv) sends the product offer request to the p-sale app. The p-sale app includes a user interface and the p-sale app is further configured to (v) display the product offer profile on the user interface. The p-sale app is configured to (vi) receive a request to purchase a physical product in the product profile, and (vii) send the purchase request to the purchase module. The purchase module, when executed by the one or more computer processors, is configured to receive the purchase request and (viii) transmit the purchase request to a fulfillment entity.

FIG. 1 is a schematic representation of a system 10 for the in-app sale of physical products on a mobile device. The system 10 includes a fulfillment module A, an application software for e-commerce sale of physical products B (or "p-sale app" B), and a purchase module C. The fulfillment module A, the p-sale app B, and the purchase module C, each is embodied in one or more computing devices, such as servers, processors, and databases, as will be discussed in detail below.

It is understood that system 10 (i) can include one or more computing devices (ii) that operate over one or more networks and (iii) provide services by implementing the execution of code modules on the one or more computing devices. Each of the processes, described in the following sections with respect to system 10 may be embodied in, and fully or partially automated by, code modules executed by one or more computers or computer processors. The code modules may be stored on any type of non-transitory computer device, non-transitory computer-readable medium or computer storage device, such as hard drives, solid state memory, optical disc, and/or the like. The processes and algorithms may be implemented partially or wholly in circuitry. The results of the disclosed processes and process steps may be stored, persistently or otherwise, in any type of non-transitory computer storage such as, e.g., volatile or non-volatile storage.

A. Fulfillment Module

The fulfillment module A includes an extract/transform/load (ETL) processor 12, a product database 14, an inventory database 16, and a recommender system 18. The ETL processor 12 communicates with one or more computing devices in respective one or more fulfillment entities 20a, 20b, 20c. Each fulfillment entity may have its own electronic inventory management system/database with product data in different computer language, and different format. The ETL processor 12 extracts product data from the computing devices in each respective fulfillment entity. The extracted data includes product description, product pricing, and inventory availability. The ETL processor 12 subsequently transforms, validates, and normalizes the product data from the one or more fulfillment entities. The ETL processor 12 then loads normalized data onto the product database 14 and the inventory database 16.

In an embodiment, one, some, or all of the fulfillment entities is/are a Consumer Direct Fulfillment Entity (or "CDE"). A "CDE" is a fulfillment entity that has the ability to drop-ship directly from its warehouse to a consumer.

In an embodiment, the ETL processor 12 continuously communicates with the one or more fulfillment entities and automatically updates and normalizes the extracted product data.

In an embodiment, the ETL processor 12 utilizes multiple communication channels and/or multiple data formats in order to provide the system 10 with a large supplier pool of fulfillment entities and a large supply pool of physical products. Nonlimiting examples of suitable communication protocols utilized by the ETL processor include FTP, HTTP, EDI, and combinations thereof. Nonlimiting examples of suitable data formats utilized by the ETL processor 12 include XML, JSON, Fixed-width flat-file, and comma separate values (CSV), and combinations thereof.

The fulfillment module A advantageously provides the system 10 with access to a large pool of many suppliers of physical products that can be sold on a single app, namely the p-sale app. In an embodiment, the ETL processor 12 is in communication with from 1, or 2, or 3, or 5 or 10, or 25 to 50, or 100, or 1000 or more fulfillment entities.

The product database 14 and the inventory database 16 each receive normalized product information from the ETL processor 12. The product database 14 stores nonlimiting product details such product title, product descriptions, categories, product images. The product detail data is formatted for optimal and rapid query over multiple data points.

The inventory database 16 stores physical product pricing, product availability (i.e., quantity on-hand), supplier distribution center location and product restrictions (by location). Data storage in the inventory database 16 is optimized for frequent and continuous updates and access based on product data keys.

In an embodiment, the ETL processor 12 is in communication with two or more fulfillment entities providing a large offering of physical products to system 10. The ETL processor 12 loads onto the product database 14 and the inventory database 16 data for physical products selected from antiques, arts and crafts, automobiles, automotive equipment and accessories, books, chemicals, clothing, comestibles, consumer electronics, cosmetics, event access, event tickets, furniture, hardware, healthcare products, household appliances, janitorial supplies, jewelry, lawn care equipment, medicaments, musical instruments, tangible music recordings (albums, tapes, compact disc recordings), office equipment, pets, pet supplies, plants, safety equipment, school supplies, sporting goods, toiletries, toys, weapons, and combinations thereof.

B. Physical Product Sales Module

The system 10 includes the physical product sales module B. The physical product sales module B is embodied in one or more computing devices such as storefront server 22. The physical product sales module B includes an application software for e-commerce sale of physical products 24 (or "p-sale app" 24). The p-sale app 24 includes (i) an e-commerce physical product sale protocol 26 that is integrated into (ii) a software application 28 lacking functionality for the sale of physical products on the application ("no-sale app"). In other words, the no-sale app 28 lacks functionality to enable an end user to purchase physical products on the app.

The protocol 26 is integrated into the no-sale app 28. In an embodiment, the integration includes installing an icon on one or more display screens of the no-sale app 28. The icon (such as a "select" button) provides indicia ("buy," "purchase," "get" "shop" and the like) to inform an end user of the app that the option for the purchase of items is available. In other words, the icon "purchase" is available on the app.

The protocol 26 is created as an app-specific Uniform Resource Locator (URL). The app-specific URL is an Internet Open Standard communication interface that is recognized and understood by the p-sale app 24, the no-sale app 28, the mobile device operating system (OS), and the storefront server 22. In an embodiment, the app-specific URL is in the form of Open-Standard HTTPS protocol and is recognized by the no-sale app's operating system as a supported Internet open-standard.

The app-specific URL has two components: a first component which describes end-user specific data (i.e., that the end user is interested in a certain subject area or is part of a pre-defined demographic group) and a second component which describes the app-specific data (i.e., the no-sale app (host app) is associated to a specific content type (e.g. sports, books) and has a specific look and feel).

The integration includes linking, or otherwise connecting, the icon to the protocol 26. Connection between the icon on the no-sale app 28 and the protocol 26 transforms the no-sale app 28 into the p-sale app 24 as described further below. When an end user of the mobile device selects (taps or clicks on) the icon ("buy," "purchase," or "shop" button), the no-sale app 28 instructs the mobile device operating system (OS) to request the app-specific HTML, by way of the protocol 26, from the storefront server 22. Upon receipt of the request by the app-specific URL, the storefront server 22 delivers HTML and cascading style sheets (CSS) to the no-sale app—thereby transforming the no-sale app 28 into the p-sale app 24. In creating the app-specific URL, unique CSS is designed and configured to visually integrate the HTML into the no-sale app 28. When the mobile device OS receives the HTML returned by the storefront server 22, the mobile device OS presents the HTML using operating system APIs available to the p-sale app (i.e., the transformed no-sale app 28) which results in content (such as the product offer profile) being displayed within the transformed no-sale app (now the p-sale app 24) and offered for purchase. In this way, the protocol 26, in the form of the app-specific URL, and all of its derivatives (created by hand or by programming), initiates all of the functionality necessary to enable the e-commerce sale and purchase of physical products in the p-sale app 24.

Because the app-specific URL is a mobile OS supported Open-Standard interface, the no-sale app 28 does not need any additional software and does not itself need to know how to request or display the HTML and CSS returned by the storefront server 22 in response to the app-specific URL request. The app-specific URL contains information provided to the storefront server 22 which allows the storefront server 22 to identify the no-sale app and therefore respond with HTML and CSS that match the look and feel 44 of the no-sale app 28.

The app-specific URL syntax includes additional query-string parameters in the URL Open-Standard communication interface format which describes end-user specific data.

The query-string parameters are used by recommender system 18, in conjunction with the app-specific data component of the URL, to influence the content (i.e., product offer profile) contained within the HTML that is returned by the storefront server 22. The HTML shows, when presented in the p-sale app 24, physical products that can be purchased and that will be deemed relevant by the end-user of the p-sale app 24.

The p-sale app 24 provides screens that are visually consistent to the screens of the host app—namely, the no sale app 28. The virtually consistent screens of the p-sale app 24 have the same look and feel as the screens for the no sale app 28, and the p-sale app 24 screens provide the functionality for sale and purchase of physical products. The end user using the p-sale app never leaves the p-sale app during the sale and purchase transaction. Consequently, the system 10 and the p-sale app 24 provide for the in-app sale and purchase of physical goods.

In an embodiment, the protocol 26 is an app-specific URL link to a tailored web address. The tailored web address is hosted by, or is otherwise embodied in, the storefront server 22. The integration includes creating a web address that is specifically tailored to render display screens with the same "look and feel" as the display screens for the no-sale app 28 (the host app). Thus, when the end user selects, or otherwise actuates, the "buy" icon, the app-specific URL link directs the end user to the tailored web address. The tailored web address displays to the end user display screens having the same look and feel as the screens of the host app (i.e., the no-sale app 28). In this way, the present system advantageously provides the functionality for the sale and purchase of physical products while remaining within the host app (previously the no-sale app), thereby fulfilling an in-app sale of physical products.

The tailored web address enables the sale of physical products as will be explained below. Thus, integration of the protocol 26 into the no-sale app 28 transforms the no-sale app into the p-sale app 24. In other words, the no-sale app is transformed to the p-sale app because the tailored web address provides the no-sale app with functionality to enable in-app sale of physical products via display screens with the same look and feel as the display screens of the no sale app.

In an embodiment, the system 10—and each of recommender system 18, p-sale app 24, and protocol 26 in particular—utilize Open Standards software interfaces. Utilization of the Open Standards software interfaces advantageously enables the p-sale app to operate on any mobile device operating system.

In an embodiment, the p-sale app operates on one, some, or all of the following mobile device operating systems: Apple's App Store, Google's Google Play, Blackberry's Blackberry World, Microsoft's Windows Phone Store, Samsung's Galaxy Apps and mobile application platforms such as Facebook and Twitter.

The system 10's utilization of Open Standards software interfaces advantageously enables the p-sale app 24 to be created without the use of a specialized, proprietary, or compiled software development kit (or "SDK"), which, by definition, is not an Open Standards software interface. Rather, the p-sale app relies only on Open Standards already supported by the mobile device OS. As the mobile device OS provides this support to the p-sale app, the p-sale app therefore requires no additional software to be installed or embedded. It is understood that installing an additional functionality to an app by way of an SDK integration is more difficult (typically an order of magnitude more difficult for an app developer) than installing the same functionality into the app by way of Open Standards software interface.

In an embodiment, the system 10 excludes, or otherwise avoids, use or utilization of an SDK.

In an embodiment, the integration procedure excludes, or otherwise avoids, the use or utilization of an SDK.

In an embodiment, the operation of the recommender system 18 excludes, or otherwise avoids, the use or utilization of an SDK.

In an embodiment, the operation of the p-sale app 24 excludes, or otherwise avoids, the use or utilization of an SDK.

i. Product Offer Request

When the p-sale app 24 detects an end user of a mobile device 36 visiting the app in any app state in which a sale of a physical product could be made, the p-sale app sends a product offer request through the storefront server 22 and to the recommender system 18 in the fulfillment module A. The recommender system 18 receives the product offer request from the p-sale app 24 and prepares one or more search queries based on the product, customer, and/or app criteria specified in the product offer request.

As previously disclosed, the ETL processor 12 normalizes all product data so that all, or substantially all, the product data conforms to the recommender system 18.

In an embodiment, the recommender system 18 receives real-time dynamic product criteria from the p-sale app 24 as query-string parameters appended to the end of the app-specific URL. The query-string parameters can be different for every instance of the purchase icon ("buy" or "shop" button is selected). The query-string parameters can be based on the actions of the user at that moment, and/or the product criteria expressing end-user retail interests. Nonlimiting examples of product criteria include app user's interests; user account profile data such as age, gender, location; app user purchase history; app user content habits; app user use history, content meta data, and content keywords, content hierarchies; and product sales data.

The recommender system 18 also utilizes p-sale app specific characteristics identified by the provided app-specific URL that are determined at the time the app-specific URL is generated and made available to the p-sale app. Nonlimiting examples of p-sale app-specific characteristics include app content areas (such as sports, news, health), product type preferences (such as show more books rather than showing headphones), product format preferences (hardback books over paperback books), app location focus (such as Green Bay-based football apps).

The recommender system 18 combines the product criteria with p-sale app-specific characteristics and searches, or otherwise queries, the product database 14 and the inventory database 16 for products that meet (i) the designated criteria and (ii) the designated characteristics. With the product offerings from multiple fulfillment entities, the number of searchable physical products queried by the recommender system 18 can be on the order of 100s, 1000s, 10,000s, or 100,000s, or millions of physical products.

In an embodiment, the recommender system 18 queries product database 14 and inventory database 16 containing data from physical products selected from antiques, arts and crafts, automobiles, automotive equipment and accessories, books, chemicals, clothing, comestibles, consumer electronics, cosmetics, event access, event tickets, furniture, hardware, healthcare products, household appliances, janitorial supplies, jewelry, lawn care equipment, medicaments, musical instruments, tangible music recordings (albums, tapes, compact disc recordings), office equipment, pets, pet supplies, plants, safety equipment, school supplies, sporting goods, toiletries, toys, weapons, and combinations thereof.

The recommender system 18 converts the search results into a targeted product offer profile. The "product offer profile" (or "POP") is a list of physical products that meet individual user input criteria cross-referenced against products available in the inventory database 16. The recommender system 18 organizes the retrieved products based on product format and sales history and prepares a ranked set of products in the POP.

In an embodiment, the POP is a limited product offer profile and includes from 1 or 2, or 3, or 5 to 7, or 9, or 10 physical products. The limited POP is optimized for mobile devices where only a limited number of products can be presented on-screen to an end user. In a further embodiment, the limited POP includes from 1, or 2, or 3 to 4, or 5 physical products.

The recommender system 18 sends the product offer profile to the storefront server 22 of the physical product purchase module B. The storefront server 22 processes and formats the product offer profile for display on the user interface of the p-sale app 24.

In an embodiment, the recommender system 18 utilizes, or is otherwise configured to operate with, one or more Open Standards software interfaces. Utilization of Open Standards software interfaces such as HTML and HTTP advantageously enables the recommender system 18 to request display screens by exchanging, or otherwise passing, URL parameters to the storefront server 22 which correspondingly responds with product screens that can be rendered by any mobile device operating system that supports Open Standards software interfaces. The result is extremely fast (real-time, or near real-time) data queries by the recommender system 18.

In an embodiment, the recommender system 18 performs queries and prepares the POP in real-time or near real-time. In other words, the start-to-end duration between (i) the p-sale app's product request to the recommender system 18 and (ii) the recommender system's delivery of the POP back to the p-sale app 24 is from 0.5 seconds, or 1 second, or 2 seconds, or 3 seconds, or 4 seconds to less than 5 seconds, or 5 seconds, or 6 seconds, or 7 seconds, or 9 seconds, or less than 10 seconds.

In an embodiment, the recommender system 18 creates a product offering profile in advance of an end user visiting the p-sale app.

In an embodiment, the p-sale app 24 sends URL-related data from the end user's mobile device to the recommender system 18. Nonlimiting examples of mobile device URL-related data include URL-encoded querystring parameters browse history, cookies, and location data. The recommender system 18 subsequently creates query criteria, searches the product database 14 and the inventory database 16 based on the query criteria, and generates a product offering profile based on the query data. In this way, the recommender system 18 creates a tailored product offering profile for the end user interacting with the p-sale app.

C. Purchase Module

The recommender system 18 sends the POP to the storefront server 22. The storefront server 22 formats the POP and renders, or otherwise presents, product images and corresponding product descriptors (physical product content) for display on the p-sale app user interface. In an embodiment, display of the product content occurs when the end user selects the "buy" icon. Alternately, the p-sale app 24 can be configured to display content for physical products immediately upon an end user's visit to the p-sale app.

The p-sale app 24 is configured to receive a request to purchase one or more of the physical products displayed. The purchase request is triggered when the end user of the mobile device 36 selects from the POP, a physical product for purchase and proceeds through, and completes, the entry fields in the payment screens.

The p-sale app 24 sends the purchase request to an order server 30 (vis-à-vis the storefront server 22) that is present in the purchase module C. The order server 30 automatically places an electronic purchase order for the physical product(s) selected in-app (i.e., within the p-sale app 24) with each fulfillment entity carrying the product(s). For expediency, the order server 30 communicates with each fulfillment entity simultaneously, or substantially simultaneously, utilizing the communication protocol and data format for each respective fulfillment entity. In this way, the purchase request is submitted simultaneously, or substantially simultaneously, with multiple fulfillment entities increasing the rate of product fulfillment and decreasing the time required for product fulfillment.

In an embodiment, the order server 30 utilizes one, some, or all of the following communication protocols to submit the purchase request with the fulfillment entity; FTP, HTTP, and EDI. In a further embodiment, the order server 30 utilizes one, some, or all of the following data formats (alone or in conjunction with the communication protocols) to submit the purchase request with one or more fulfillment entities: XML, JSON, fixed-width, flat-fill, and CSV.

The order server 30 then receives replies from each fulfillment entity either confirming or rejecting the purchase request. For rejections, the fulfillment entity provides the order server with a reason for the rejection—i.e., product out of stock.

In an embodiment, the order server 30 interrogates each fulfillment partner that confirms the purchase request can be fulfilled. The order server 30 sends inquiries regarding the item selling price, and/or cost of goods sold, for example. Based on the responses from the multiple fulfillment entities, the order server 30 then determines which fulfillment entity will deliver the highest rate of return and selects this fulfillment entity to fulfill the purchase request.

The order server 30 subsequently coordinates the replies from each fulfillment entity by normalizing the reply contents into a common order status format, tracking the status of the purchase order, and storing the purchase order status from each fulfillment entity. The order server 30 provides status updates on the purchase order status to the end user (via email or text message) vis-à-vis the storefront service 22 and the p-sale app 24. The order server 30 notifies the p-sale app 24 when the purchased product is shipped by the fulfillment entity. The order server 30 also notifies the p-sale app 24 when the fulfillment entity delivers the purchased physical product to the end user designated delivery point. The p-sale app 24 then transmits a message to the end user informing the end user of the status of delivery and/or completion of delivery of the physical good to the user's designated delivery destination (e-mail or text message, for example). In this way, the system 10 confirms delivery of the purchased physical good to the physical location specified by the end user in the purchase request.

The order database 32 keeps a historical record of all placed orders received through the p-sale app 24 and fulfilled by any and all fulfillment entities.

In an embodiment, purchase information (financial transaction information and delivery and destination information) is entered into respective screens of the p-sale app 24 by the end user. Payment data input by the end user into the p-sale app 24 is delivered to a third party for processing. End-user payment details (credit card or other financial transaction identifier) are entered in-app in the p-sale app 24 in payment screens and encrypted for delivery to the storefront server 22. The storefront server 22 passes the encrypted payment information to a third-party payment processing server 34. The third-party payment processing server 34 receives encrypted end-user payment information, such as credit card number or other financial transaction identifier, passes it to the end-user's credit card issuing bank for verification and authorization. Once authorized, funds to the total of the sale of physical products are captured and the financial transaction is completed with the transfer of funds to a designated bank account. For example, the designated bank account may be the bank account for the owner or operator of the no-sale app.

A mobile device is capable of running multiple applications simultaneously and allows an end-user to switch from one application to another. End-users interact with one application at a time and this is considered the foreground application. The present system 10 advantageously provides functionality that is enabled via Open Standards HTML presented within the p-sale app foreground application so that an end user can go from physical product offers through physical product purchase without switching from the foreground p-sale app to another foreground application. This is done entirely white-labeled (or app-specific brand-able) so that the p-sale app's branding is singularly persisted and conforms to, or otherwise matches, the branding, and the look and feel of host app's (no-sale app) display screens. The present system and process avoids switching the end user from one app and into another; such switching results in a context change that is deleterious to user sales.

Advantageously, the p-sale app's "Buy" button does not initiate a change to the foreground running application. Instead, when the "buy" button is selected, the p-sale app instructs the mobile device operating system to request and display the Open-Standards app-specific HTML into the current foreground application. The app-specific HTML is visually consistent with the foreground application thereby ensuring steps in the offer to purchase of physical products occur in-app (in the p-sale app 24).

From the app provider's perspective, the p-sale app has e-commerce functionality that is enabled by the system 10; a value-add for the p-sale app provider and its users.

From the end-user's perspective, the end user never leaves the p-sale app throughout the entire sale-purchase event and therefore the end user associates the sale with the brand of, and the relationship to, the no-sale app 28.

The present disclosure provides a process. In an embodiment, a process for in application sale of physical products is provided and includes (i) integrating (a) an e-commerce physical product sale protocol into (b) a software application lacking functionality for the sale of physical products (no-sale app);

(ii) transforming the no-sale app into an e-commerce sale of physical products app (p-sale app), the p-sale app having a user interface, the p-sale app embodied in instructions stored by one or more computer devices that, when executed by one or more computer processors, is configured to:

(iii) display, on a mobile device, screens having the look and feel of the screens of the no-sale app, a product offer profile of one or more physical products;

(iv) receive, from an end-user of the mobile device, a request to purchase a physical product from the product order profile; and (v) send the purchase request to a fulfillment entity.

In an embodiment, the receive step includes receiving end user purchase information.

In an embodiment, the fulfillment module including the recommender system is provided. The recommender system is in communication with the p-sale app. The process includes generating, with the recommender system, the product offer profile with a recommender system, the recommender system utilizing real-time data input criteria obtained from both the end-user and the p-sale app.

In an embodiment, the integrating step further comprises installing an icon (such as a button) on the no-sale app; and connecting, with the protocol, the icon to the tailored website. The tailored website displays screens on the mobile device that have the same look and feel as the look and feel of the no-sale app.

In an embodiment, the display step includes displaying a limited product offer profile on the mobile device.

The present system and process provide a platform whereby the mobile app user remains in the content creator's app (i) from before the purchase of physical goods (ii) to the completion of the purchase of physical goods. The app user never leaves the p-sale app where both the content and e-commerce reside. In this way, the present system/process provides a seamless integration of a no-sale app into a p-sale app, reduces checkout friction, and leads to higher conversion rates for the no-sale app content creator.

Products presented by the present system/process are tailored to the content of the initial no-sale app and, as the app-specific URL conveys information to the storefront server describing what the user of no-sale app is expressing an interest in, the storefront server can respond with products that align with the user's interests. The offered physical products therefore provide valuable content to the mobile app user, elevating brand equity for the initial no-sale app content creator.

Figure 2:
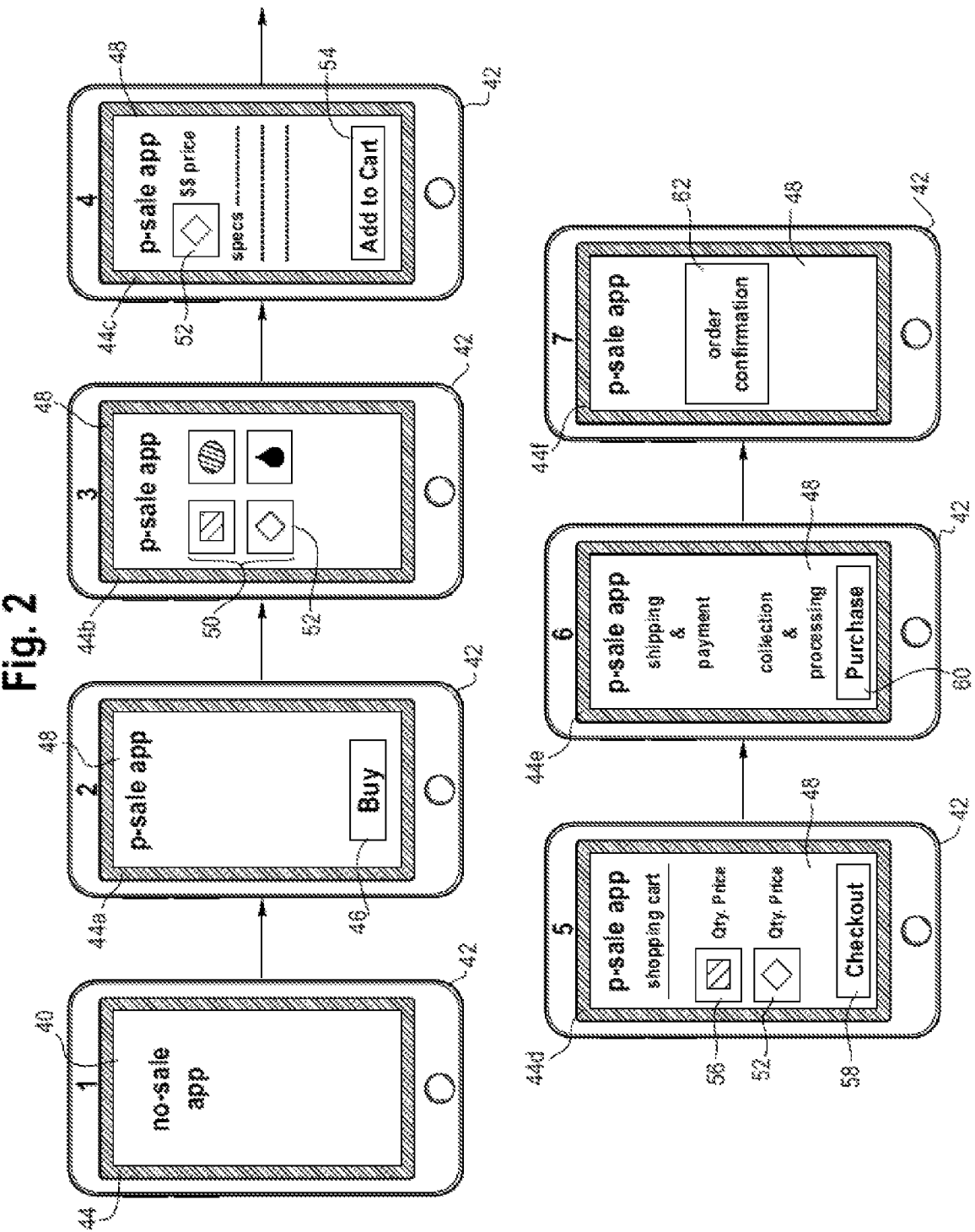
FIG. 2 is a schematic representation of a flow diagram identifying embodiments of the system of FIG. 1.

FIG. 2 schematically illustrates a logical flow diagram for an example application processing scenario involving the system 10 of FIG. 1.

Event 1. A host app, such as a no-sale app 40 is operating on a mobile device, smartphone 42. The no-sale app 40 has a user interface and a display screen with a look-and-feel 44. The no-sale app lacks the functionality for the purchase of physical goods.

Event 2. Integration of the protocol (such as protocol 26 as previously disclosed) is accomplished with an icon (a button 46) installed on the no-sale app 40, transforming the no-sale app 40 to a p-sale app 48. The protocol connects the button 46 to a tailored web address. The look-and-feel 44a of the p-sale app 48 display screen containing the button 46 is the same as the look-and-feel 44 of the no-sale app 40.

Event 3. An end user selects a button 46 ("buy") which directs the p-sale app 48 to a tailored web address. Connection to the tailored web address is transparent to the end user. The tailored web address displays a limited product offer profile 50 generated by the recommender system and the other components of the fulfillment module A. The look-and-feel 44b of the p-sale app 48 display screen containing the limited product offer 50 is the same as the look-and-feel 44 of the no-sale app 40.

Event 4. The end user initiates a purchase request by selecting a physical product 52 (a diamond) in the product offer profile 50. The user adds physical product 52 to a shopping cart 54. The p-sale app communicates with a payment processing server to process the purchase transaction. The look-and-feel 44c of the p-sale app 48 display screen containing the shopping cart 54 is the same as the look-and-feel 44 of the no-sale app 40.

Event 5. The end user continues the purchase transaction by selecting physical product 56 ("square") for purchase. The end user proceeds to select the checkout button 58 to proceed to checkout. The look-and-feel 44*d* of the p-sale app 48 display screen for checkout is the same as the look-and-feel 44 of the no-sale app 40.

Event 6. The end user completes the purchase transaction confirming the number and type of physical goods 52, 56 and selecting the purchase button 60. With the purchase transaction complete, the p-sale app sends a purchase request to the purchase module C. The components of the purchase module C communicate with one or more fulfillment entities to full the purchase request. The storefront server communicates the payment data to the third party payment processing server. The look-and-feel 44*e* of the p-sale app 48 display screen completing the purchase is the same as the look-and-feel 44 of the no-sale app 40.

Event 7. The p-sale app 48 displays an order confirmation 62 and corresponding order details. The look-and-feel 44*f* of the p-sale app 48 display screen showing the order confirmation is the same as the look-and-feel 44 of the no-sale app 40. The look and feel of the display screens from Event 1 through Event 7 is the same. The foreground application running from Event 1 through Event 7 is the same.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A system for in-application sale of physical products on a mobile device, the system comprising:
   one or more computer devices;
   one or more computer processors;
   A. a fulfillment module embodied in instructions stored by the one or more computer devices;
   B. a physical product sale module embodied in instructions stored by the one or more computer devices, comprising
   a mobile software application lacking functionality for the sale of physical products (no-sale app),
   an e-commerce physical product sale protocol that is a mobile app-specific Open-Standards Uniform Resource Locator (URL), the URL integrated into the no-sale app by installing an icon on a display screen of the no-sale app, the URL linked to the icon;
   selection of the icon by an end user of the mobile device instructs an operating system of the mobile device to request an app-specific HTML from a storefront server by way of the app-specific Open-Standards URL;
   the app-specific HTML subsequently delivering cascading style sheets to the no-sale app,
   the cascading style sheets having the same look and feel of the no-sale app display screens to visually integrate into the no-sale app and transform the no-sale app into an application software for e-commerce sale of physical products (p-sale app);
   C. a purchase module embodied in instructions stored by the one or more computer devices;
   the p-sale app embodied in instructions stored by the one or more computer devices that, when executed by the one or more computer processors, is configured to:
   (i) send a product offer request to the fulfillment module, the product offer request comprising product, customer, or app criteria,
   the fulfillment module, when executed by the one or more computer processors, is configured to:
   (ii) search one or more physical product databases of the fulfillment module based on criteria in the product offer request,
   (iii) generate a product offer profile based on the app criteria or the criteria in the product offer request, and
   (iv) send the product offer profile to the p-sale app; the p-sale app comprising a user interface, the p-sale app further configured to:
   (v) display the product offer profile on the user interface,
   (vi) receive a request to purchase a physical product present in the product offer profile,
   (vii) send the purchase request to the purchase module; and
   the purchase module, when executed by the one or more computer processors, is configured to:
   (viii) send the purchase request to a fulfillment entity.

2. The system of claim 1 wherein the purchase module is configured to:
   (ix) confirm delivery of the physical product.

3. The system of claim 1 wherein the p-sale app is further configured to:
   display the product offer profile on the mobile device.

4. The system of claim 1 wherein the fulfillment module communicates with one or more fulfillment entities.

5. The system of claim 1 wherein the physical products in the product offer profile are selected from group consisting of antiques, arts and crafts, automobiles, automotive equipment and accessories, books, chemicals, clothing, comestibles, consumer electronics, cosmetics, event access, event tickets, furniture, hardware, healthcare products, household appliances, janitorial supplies, jewelry, lawn care equipment, medicaments, musical instruments, tangible music recordings, office equipment, pets, pet supplies, plants, safety equipment, school supplies, sporting goods, toiletries, toys, weapons, and combinations thereof.

6. The system of claim 1 wherein at least one of the fulfillment module, the physical product sale module, and the purchase module is configured to operate on one or more Open Standards software interfaces.

7. The system of claim 1 wherein the p-sale app is configured to operate on a mobile device operating system downloaded from an application distribution platform.

8. The system of claim 1 wherein the fulfillment module comprises a recommendation system, the recommendation system embodied in instructions stored by the one or more computer devices that, when executed by the one or more computer processors, is configured to:
   receive the product offer request from the p-sale app; and
   generate a tailored product offer profile.

9. The system of claim 8 wherein the product offer profile is a limited product offer profile optimized for display on the mobile device.

10. The system of claim 1 wherein the app-specific Open-Standards URL is a software interface selected from the group consisting of HTTP, HTTPS, HTML, JAVASCRIPT, TCP/IP, VoiceXML, XML, SQL, and combinations thereof.

11. The system of claim 10 wherein the mobile app-specific Open-Standards Uniform Resource Locator URL is recognized and understood by the p-sale app, the no-sale app, and the operating system of the mobile device.

12. The system of claim 11 wherein the app-specific Open-Standards URL comprises
   a first component comprising query-string parameters which describe end-user specific data selected from the group consisting of end user subject area interest and end user pre-defined demographic group; and a second component which describes the app-specific data selected from the group consisting of pre-defined content type and cascading style sheets with a pre-defined look and feel.

13. The system of claim 12 wherein the app-specific Open-Standards URL links to a tailored web address hosted by the storefront server; and the tailored web address renders display screens on the mobile device having the same look and feel as the display screens for the no-sale app.

14. The system of claim 13 wherein the app-specific Open-Standards URL operates on Open Standards software to the exclusion of proprietary software.

15. The system of claim 14 wherein app-specific Open-Standards URL operates on Open Standards software to the exclusion of a software development kit.

16. A process for in application sale of physical products on a mobile device having an operating system comprising:

integrating (i) an e-commerce physical product sale protocol that is a mobile app-specific Open-Standards Uniform Resource Locator (URL) into (ii) an icon installed on a display screen of a mobile software application lacking functionality for the sale of physical products (no-sale app);

instructing with the URL, the mobile device operating system to request an app-specific HTML from a storefront server;

delivering to the mobile device, with the app-specific HTML, cascading style sheets having the same look and feel of display screens of the no-sale app transforming the no-sale app into an e-commerce sale of physical products app (p-sale app), the p-sale app having a user interface, the p-sale app embodied in instructions stored by one or more computer devices that, when executed by one or more computer processors, is configured to:

display, on the mobile device, screens from the cascading style sheets having the look and feel of the screens of the no-sale app, and a product offer profile for one or more physical products;

receive, from an end-user of the mobile device, a request to purchase a physical product from the product order profile; and send the purchase request to a fulfillment entity.

17. The process of claim 16 wherein the receive step comprises receiving end user purchase information.

18. The process of claim 16 further comprising providing a fulfillment module comprising a recommender system, the recommender system embodied in instructions stored by one or more computer devices that, when executed by the one or more computer devices is configured to:

generate the product offer profile utilizing real-time data input criteria obtained from the end user's mobile device and the p-sale app.

19. The process of claim 16 wherein the integrating further comprises installing an icon on the no-sale app; and connecting, with the protocol, the icon to a tailored website having display screens with the same look and feel as the look and feel of the no-sale app display screens.

20. The process of claim 16 wherein the display step comprises displaying a limited product offer profile on the mobile device.

* * * * *